(12) United States Patent
Boncato et al.

(10) Patent No.: US 9,906,121 B2
(45) Date of Patent: Feb. 27, 2018

(54) CONTROL CIRCUITS AND METHODS FOR TRANSITIONING BETWEEN POWER CONVERTER CONTROL MODES

(71) Applicant: Astec International Limited, Kowloon (HK)

(72) Inventors: Yancy Fontanilla Boncato, Quezon (PH); James Sigamani, Pasig (PH); Jonathan Ross Bernardo Fauni, Quezon (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 4 days.

(21) Appl. No.: 14/878,442

(22) Filed: Oct. 8, 2015

(65) Prior Publication Data

US 2017/0104407 A1    Apr. 13, 2017

(51) Int. Cl.
*H02M 3/04* (2006.01)
*H02M 3/156* (2006.01)

(52) U.S. Cl.
CPC ............ *H02M 3/04* (2013.01); *H02M 3/156* (2013.01)

(58) Field of Classification Search
CPC ......... H02M 1/08; H02M 3/156; H02M 3/157
See application file for complete search history.

(56) References Cited

U.S. PATENT DOCUMENTS

| 7,098,622 | B2 | 8/2006 | Vulovic | |
|---|---|---|---|---|
| 7,843,174 | B2 | 11/2010 | Ting | |
| 2007/0194759 | A1* | 8/2007 | Shimizu | H02J 7/0016 320/166 |
| 2008/0238387 | A1* | 10/2008 | Schmeller | H02M 3/156 323/282 |
| 2013/0258731 | A1 | 10/2013 | Xu et al. | |
| 2014/0145679 | A1* | 5/2014 | Chen | H02M 3/1582 320/128 |
| 2015/0200593 | A1* | 7/2015 | Stoichita | H02M 3/158 323/271 |
| 2016/0065137 | A1* | 3/2016 | Khlat | H03F 3/19 455/114.3 |
| 2016/0261194 | A1* | 9/2016 | Lam | H02M 3/33507 |

* cited by examiner

*Primary Examiner* — Adolf Berhane
*Assistant Examiner* — Bart Iliya
(74) *Attorney, Agent, or Firm* — Harness, Dickey & Pierce, P.L.C.

(57) ABSTRACT

A control circuit includes a first integrator circuit corresponding to a first mode and a second integrator circuit corresponding to a second mode. The control circuit is configured to transition control of the power converter between the first mode and the second mode such that one of the first mode and the second mode is a controlling mode for a period of time and the other one of the first mode and the second mode is a non-controlling mode for the period of time, and set an output of the first integrator circuit or the second integrator circuit corresponding to the non-controlling mode to equal an output of the first integrator circuit or the second integrator circuit corresponding to the controlling mode. Other example control circuits, power converters including a control circuit, and methods for controlling a power converter are also disclosed.

19 Claims, 8 Drawing Sheets

CONTROL CIRCUITS AND METHODS FOR TRANSITIONING BETWEEN POWER CONVERTER CONTROL MODES

FIELD

The present disclosure relates to control circuits and methods for transitioning between power converter control modes.

BACKGROUND

This section provides background information related to the present disclosure which is not necessarily prior art.

Power converters are commonly operated in different control modes depending on one or more parameters. For example, a power converter can be controlled in its constant voltage mode at times and its constant current mode at other times. Typically, a control circuit includes compensators for controlling the power converter in the appropriate control mode.

SUMMARY

This section provides a general summary of the disclosure, and is not a comprehensive disclosure of its full scope or all of its features.

According to one aspect of the present disclosure, a control circuit for controlling a power converter to operate in a first mode and a second mode different than the first mode includes a first integrator circuit corresponding to the first mode and having an output and a second integrator circuit corresponding to the second mode and having an output. The control circuit is configured to transition control of the power converter between the first mode and the second mode such that one of the first mode and the second mode is a controlling mode for a period of time and the other one of the first mode and the second mode is a non-controlling mode for the period of time, and set the output of the first integrator circuit or the second integrator circuit corresponding to the non-controlling mode to equal the output of the first integrator circuit or the second integrator circuit corresponding to the controlling mode.

According to another aspect of the present disclosure, a method of configuring a control circuit for controlling a power converter controllable to operate in a first mode and a second mode different than the first mode such that one of the first mode and the second mode is a controlling mode for a period of time and the other one of the first mode and the second mode is non-controlling mode for the period of time is disclosed. The control circuit includes a first integrator circuit corresponding to the first mode and a second integrator circuit corresponding to the second mode. The method includes setting an output of the first integrator circuit or the second integrator circuit corresponding to the non-controlling mode to equal an output of the first integrator circuit or the second integrator circuit corresponding to the controlling mode and transitioning control of the power converter from the first mode or the second mode corresponding to the controlling mode to the first mode or the second mode corresponding to the non-controlling mode.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
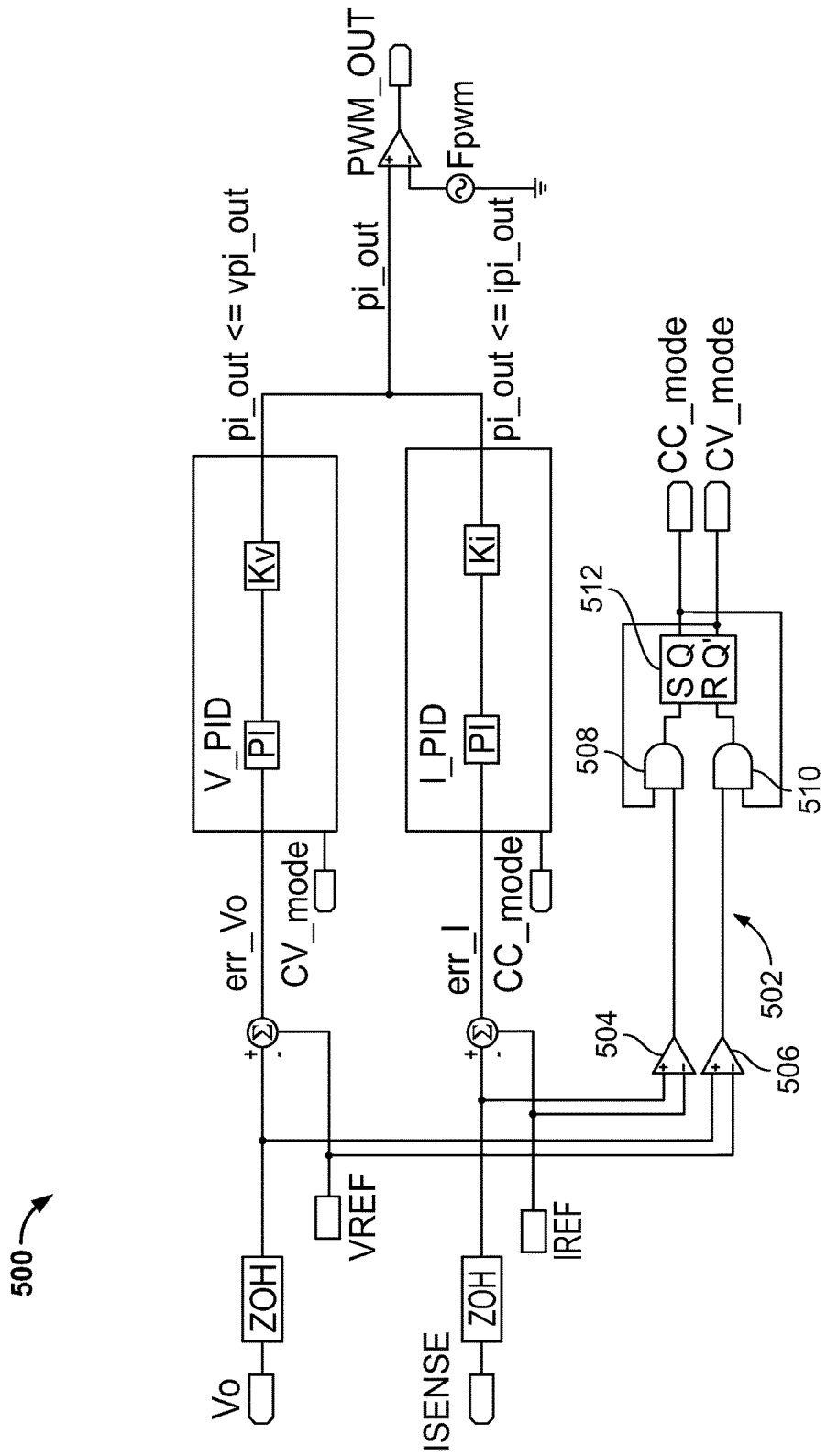
FIG. 5 is a block diagram of a digital control circuit that transitions between controlling a power converter in a constant voltage mode and a constant current mode based on two sensed parameters and two references according to yet another example embodiment.
Figure 6:
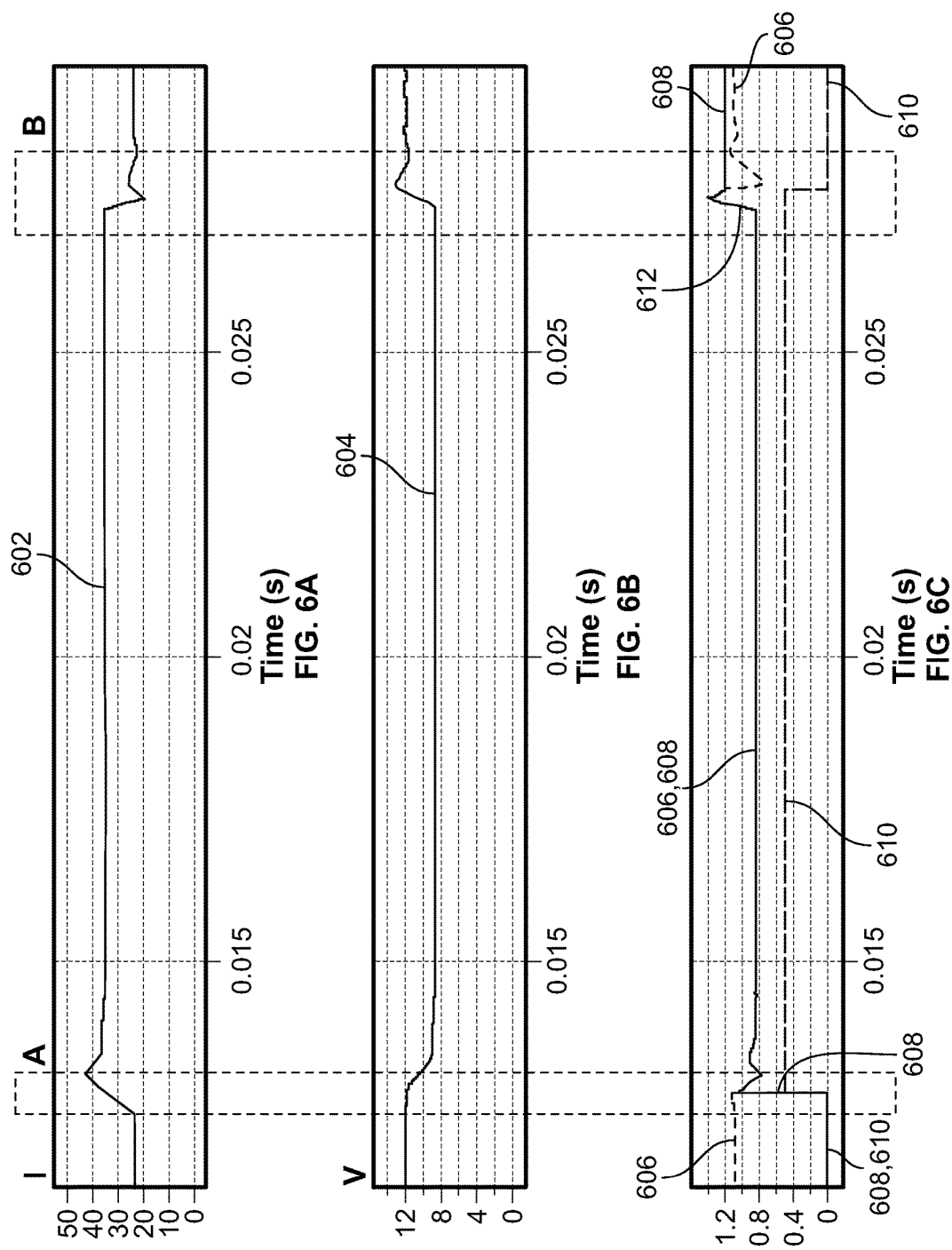

FIGS. 6A-C illustrate waveforms of an output voltage and an output current of a power converter controlled by the digital control circuit of FIG. 5, and a current compensator output of the digital control circuit of FIG. 5.

Figure 7:
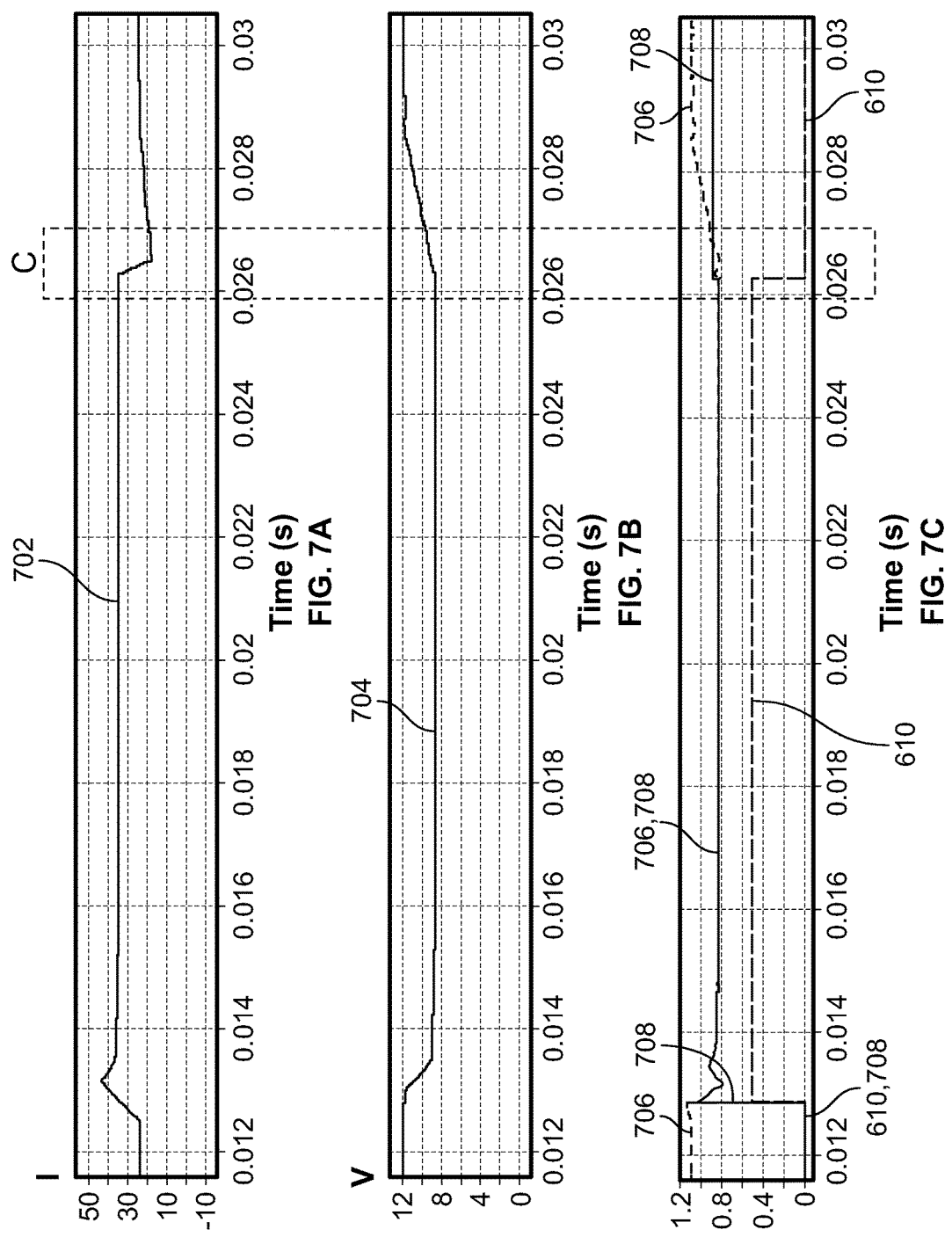

FIGS. 7A-C illustrate waveforms of an output voltage and an output current of a power converter controlled by the digital control circuit of FIG. 5, and a current compensator output of the digital control circuit of FIG. 5 when the power converter is controlled to provide a soft start.

Figure 8:
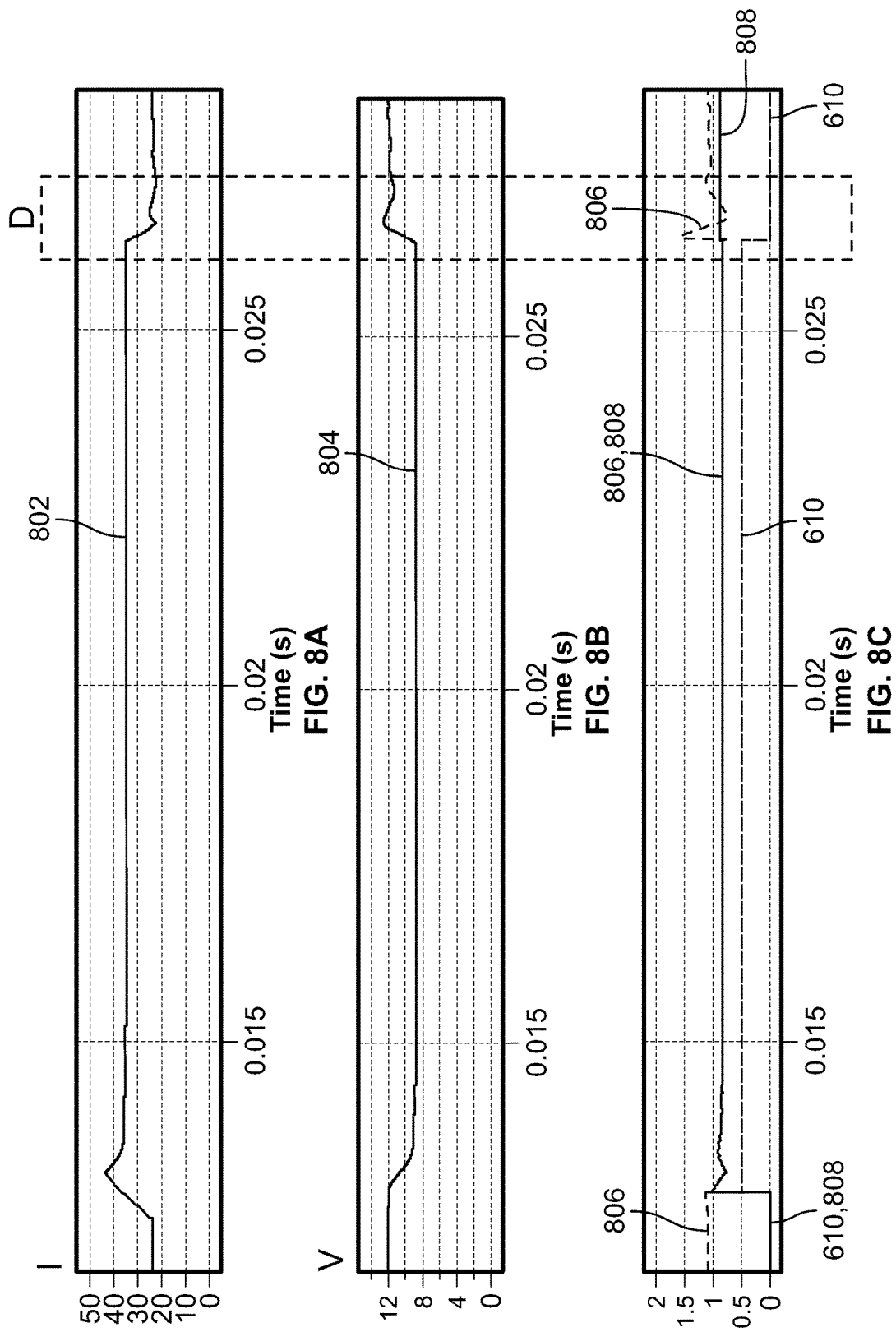

FIGS. 8A-C illustrate waveforms of an output voltage and an output current of a power converter controlled by the digital control circuit of FIG. 5, and a current compensator output of the digital control circuit of FIG. 5 where transitioning between modes is based on an output current condition.

Figure 9:
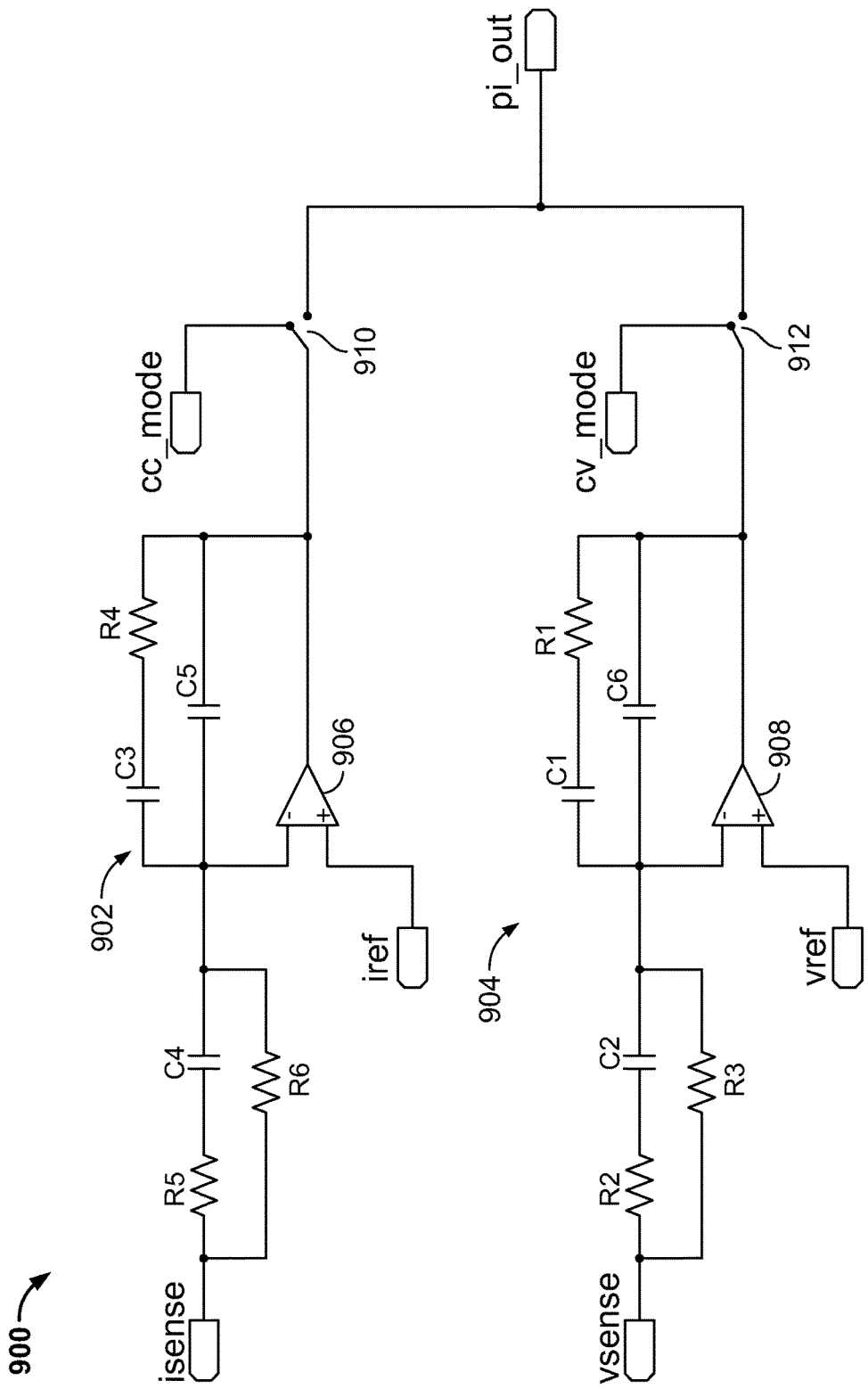

FIG. 9 is a block diagram of an analog control circuit that transitions between controlling a power converter in a constant voltage mode and a constant current mode according to another example embodiment.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
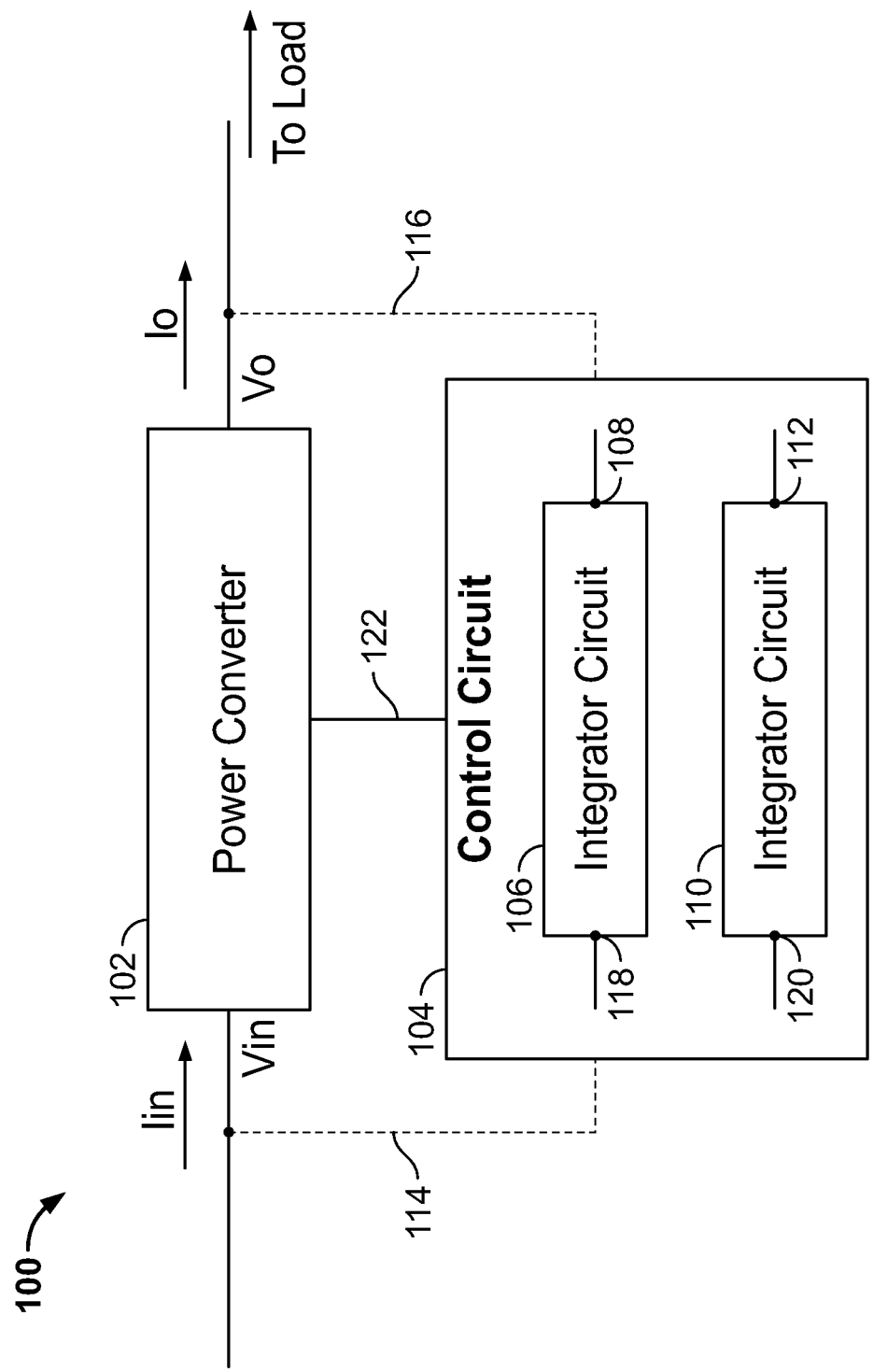
FIG. 1 is a block diagram of a power system including a power converter operable in multiple modes and a control circuit in which an output of one of its integrator circuit is set to equal an output of another one of its integrator circuit according to one example embodiment of the present disclosure.

A power system for providing power to a load according to one example embodiment of the present disclosure is illustrated in FIG. 1 and indicated generally by reference number 100. As shown in FIG. 1, the power supply system 100 includes a power converter 102 and a control circuit 104 coupled to the power converter 102 for controlling the power converter 102 to operate in one mode (e.g., mode 1) and another different mode (e.g., mode 2). The control circuit 104 includes an integrator circuit 106 corresponding to mode 1 and having an output 108 and an integrator circuit 110 corresponding to mode 2 and having an output 112. The control circuit 104 transitions control of the power converter 102 between mode 1 and mode 2 such that one of the modes is a controlling mode for a period of time and the other one of the modes is non-controlling mode for the period of time. The control circuit 104 is also configured to set the output 108, 112 of the integrator circuit 106, 110 corresponding to the non-controlling mode to equal the output 108, 112 of the integrator circuit 106, 110 corresponding to the controlling mode.

For example, if the power converter 102 is operated in mode 1, mode 2 is considered the non-controlling mode and mode 1 is considered the controlling mode. In this particular example, the output 108 of the integrator circuit 106 corresponding to mode 1 is captured and the output 112 of the integrator circuit 110 corresponding to mode 2 is set to equal the output 108 of the integrator circuit 106. If, however, the power converter 102 is operated in mode 2, mode 1 is considered the non-controlling mode and mode 2 is considered the controlling mode. In this case, the output 112 of the integrator circuit 110 corresponding to mode 2 is captured and the output 108 of the integrator circuit 106 corresponding to mode 1 is set to equal the output 112 of the integrator circuit 110.

The integrator circuits 106, 110 dictate a duty cycle or a period of one or more control signals for controlling the power converter. Thus, by setting the output of the non-controlling integrator circuit to equal the output of the controlling integrator circuit, the non-controlling integrator circuit can use this set output as a starting point for a desired control signal for controlling the power converter 102 instead a default value of zero as is conventionally employed. Therefore, the non-controlling integrator circuit is not in a saturated state before a control mode transition takes place.

As such, the non-controlling integrator circuit can be pre-conditioned to assume a valid state based on the set output before an actual transition of control mode is made and before the integrator circuit's output is adjusted accordingly. Thus, as a result of this non-zero starting point of the non-controlling integrator circuit, the duty cycle or the period of the control signal(s) may respond quicker to a change in the control mode than conventional systems.

When the control circuit 104 transitions between control modes, the controlling integrator circuit (previously the non-controlling integrator circuit) can change state based on one or more active control parameters thereby replacing the previously set integrator circuit output. In such examples, the non-controlling integrator circuit which has its output set may use the set output as look-ahead information. As such, the control circuit 104 can react quicker to a transition in control modes and with better accuracy than traditional transition methods.

Modes 1, 2 of the power converter 102 can be a variety of different modes. For example, and as further explained below, the control circuit 104 may control the power converter 102 to operate in a constant voltage (CV) mode and a constant current (CC) mode. In such examples, mode 1 can be a CV mode or a CC mode and mode 2 can be a CC mode or a CV mode. In other embodiments, mode 1 and/or mode 2 may be another suitable control mode.

The output of the non-controlling integrator circuit may be set to equal the output of the controlling integrator circuit at any given point in time after the controlling integrator circuit generates an output and before the control circuit 104 transitions control of the power converter 102 between the modes. In some examples, the output of the integrator circuit corresponding to the non-controlling mode is set one time or multiple times. For example, the output of the non-controlling integrator circuit may be set one time after the controlling integrator circuit generates an output. This may happen after the controlling integrator circuit generates its first output, during a transition between mode 1 and mode 2, etc.

In other embodiments, the output of the non-controlling integrator circuit may be updated periodically or randomly, etc. For example, and as explained above, the integrator circuit 106, 110 corresponding to the controlling mode dictates the duty cycle or the period of the switching control signal(s). Thus, when a change in the duty cycle or the period of the signal(s) is needed, the output of the controlling integrator circuit changes accordingly. As such, the output of the non-controlling integrator circuit may be set and then reset (e.g., updated) when the output of the controlling integrator circuit changes (e.g., each cycle, etc.). In other examples, the output of the non-controlling integrator circuit may freely change.

The output of the non-controlling integrator circuit may be equal to any suitable value before it is set to equal the output of the controlling integrator circuit. For example, the output of the non-controlling integrator circuit may be equal to its last value before transitioning to its non-controlling state and then set to equal the output of the controlling integrator circuit. In other embodiments, the output of the non-controlling integrator circuit may be equal to zero, a max value, or another suitable value.

As shown in FIG. 1, the control circuit 104 is capable of sensing (e.g., using one or more appropriate sensors) any one or more input parameters via signal 114 and/or any one or more output parameters via signal 116. The sensed input parameters can include an input voltage Vin and an input current Iin and the sensed output parameters include the output voltage Vo and an output current Io. Additionally and/or alternatively, a sensed temperature, a sensed intermediate voltage and/or current, and/or another suitable parameter can be utilized by the control circuit 104 if desired.

Although not shown in FIG. 1, the control circuit 104 one or more error signals based on the sensed parameter(s) (e.g., the output voltage Vo, the input current Iin, etc.) is provided to inputs 118, 120 of the integrator circuits 106, 110, respectively. At least one of the integrator circuits 106, 110 (e.g., the controlling integrator circuit) and other circuits (if applicable) of the control circuit 104 can use the error signal(s) to generate one or more control signals 122 for controlling the power converter 102. For example, the control signal(s) may be pulse width modulated (PWM) control signals, pulse frequency modulated (PFM) control signals, etc. for controlling one or more power switches (not shown) of the power converter 102.

The control circuit 104 of FIG. 1 can transition between modes based on one or more sensed parameter. For example, and as further explained below, the control circuit 104 can transition between mode 1 and mode 2 based on comparisons between two or more parameters and two or more references. Outputs of the comparisons may be used independently (as further explained below), used together, etc. for transitioning between modes. In other embodiments, the control circuit 104 transitions between mode 1 and mode 2 based on a comparison between one sensed parameter and a reference.

Figure 2:
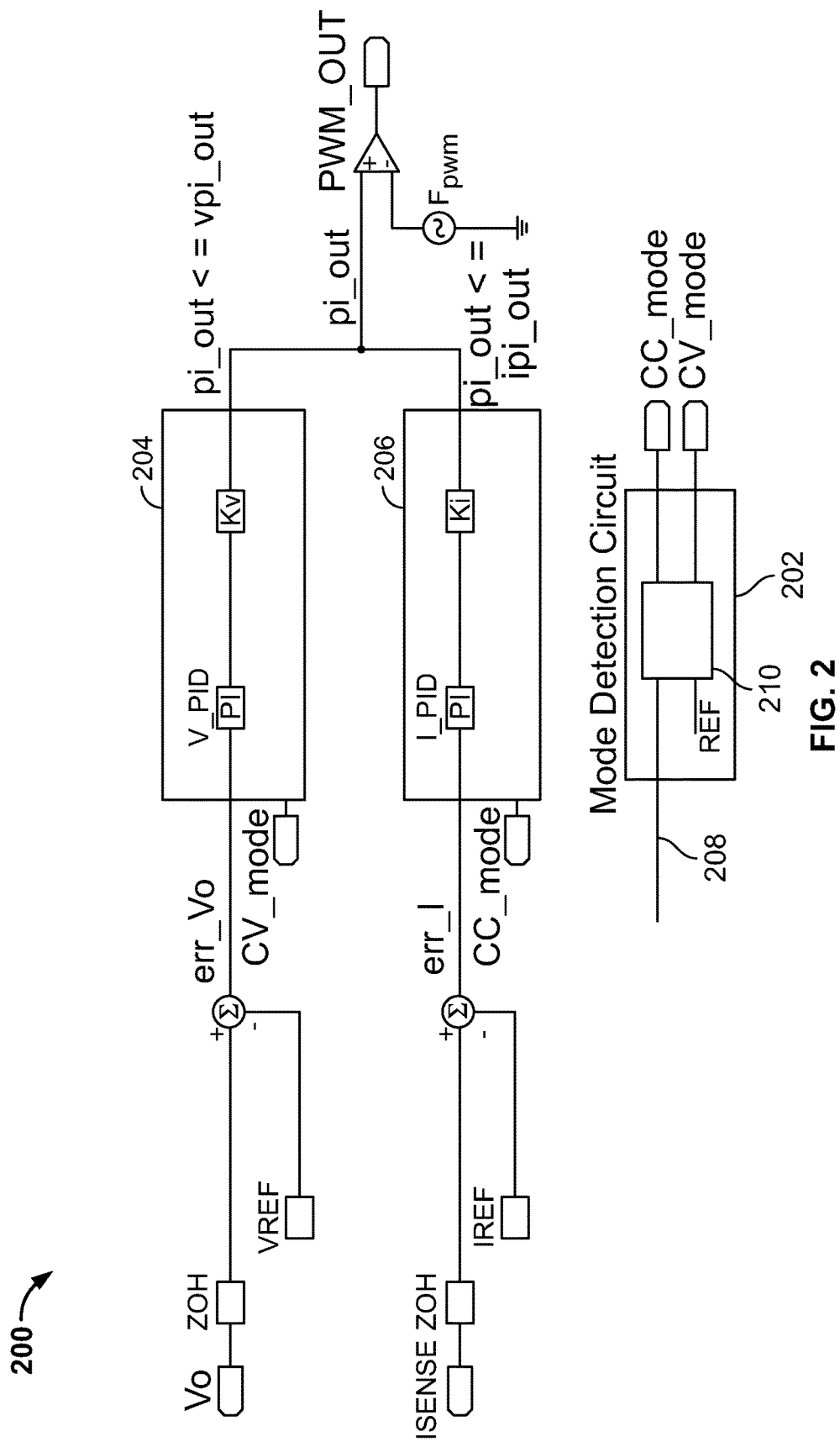
FIG. 2 is a block diagram of a digital control circuit that transitions between controlling a power converter in a constant voltage mode and a constant current mode based on a comparison between one sensed parameter and a reference according to another example embodiment.

For example, FIG. 2 illustrates a digital control circuit 200 that may be employed as the control circuit 104 of FIG. 1. The digital control circuit 200 can control any one of the power converters disclosed herein to operate in a CV mode and a CC mode based on a comparison between one sensed parameter and a reference.

The digital control circuit 200 includes a mode detection circuit 202, a voltage control loop 204, and a current control loop 206. The voltage control loop 204 includes a voltage compensator V_PID and a gain block Kv coupled to the voltage compensator V_PID and the current control loop 206 includes a current compensator I_PID and a gain block Ki coupled to the current compensator I_PID. As further explained below, each compensator V_PID, I_PID includes an integrator circuit similar to the integrator circuit of FIG. 1.

As shown in FIG. 2, the voltage control loop 204 receives a voltage error signal err_Vo based on a sensed output voltage Vo of the power converter and a voltage reference VREF and the current control loop 206 receives a current error signal err_I based on a sensed current ISENSE of the power converter and a current reference IREF. The error signals err_Vo, err_I are provided to the compensators V_PID, I_PID, respectively, for processing.

Figure 3:
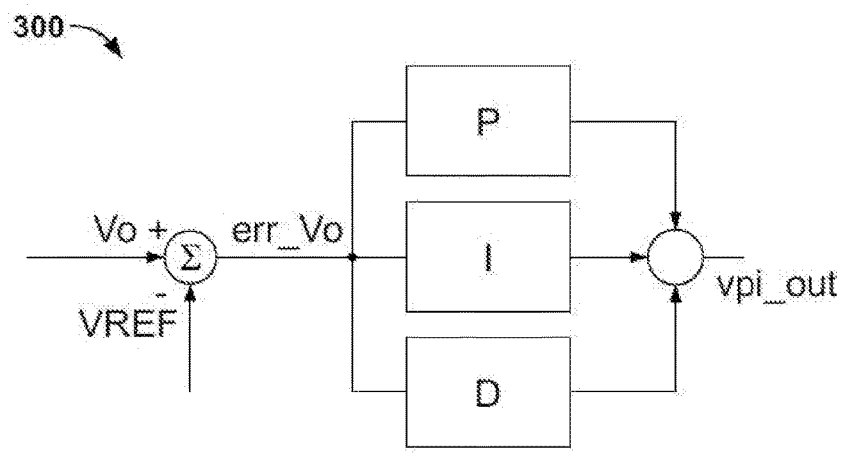
FIG. 3 is a block diagram of a voltage control loop compensator of FIG. 2 according to yet another example embodiment.

The compensators V_PID, I_PID of FIG. 2 are proportional-integral-derivative (PID) controllers. FIG. 3 illustrates one example PID controller 300 that may be used as the voltage compensator V_PID of FIG. 2. Alternatively, another suitable controller may be employed if desired. The current compensator I_PID may include a similar controller or another suitable controller.

As shown in FIG. 3, the PID controller 300 includes a proportional component P, an integrator component I, and a derivative component D. An output of each component P, I, D is computed independently and then summed to generate a PID output (shown as vpi_out in FIGS. 2 and 3). Although not shown, each component P, I, D includes various circuits (sometimes referred to as digital components). For example, the proportional component P includes a proportional circuit and a gain block, the integrator component I includes an integrator circuit and a gain block, and the derivative component I includes a derivative circuit and a gain block. The gain blocks of each component are shown collectively as the gain block KV of FIG. 2.

Referring back to FIG. 2, the mode detection circuit 202 includes a circuit 210 that receives a sensed parameter of the power converter (e.g., a voltage, a current, etc.) through a signal 208 and determines whether the power converter should be operated in a CV mode or a CC mode based on the sensed parameter and a reference REF. For example, if the sensed parameter is greater than the reference REF, then one mode (e.g., the CC mode) is selected. If, however, the sensed parameter drops below a defined value (e.g., 90 percent, etc.) of the reference REF (e.g., hysteresis), then control transitions to another mode (e.g., the CV mode). For instance, the CC mode may be selected if the sensed current ISENSE is greater than the current reference IREF, and the CV mode may be selected if the sensed current ISENSE is less than the current reference IREF minus a current hysteresis. Thus, in this particular example, a single sensed parameter is employed to determine when to transition between control modes, and hysteresis is employed to substantially prevent undesired control mode changes.

Additionally, and in some cases, this detection method based on one sensed parameter may cause oscillation between control modes. In such cases, disable detection circuits and/or delays after an initial mode change may be added to help eliminate undesired oscillation between control modes.

After determining which control mode should be employed, the mode detection circuit 202 provides a signal CV_mode, CC_mode to one or both control loops 204, 206 to activate and/or deactivate the appropriate compensator. For example, if it is determined that the power converter should be operated in its CC mode, the signal CC_mode may be high thereby activating the current compensator I_PID and the signal CV_mode may be low making the current compensator V_PID inactive. Therefore, in this particular example, the current compensator I_PID corresponding to the controlling mode is active and the voltage compensator V_PID corresponding to the non-controlling mode is inactive.

As such, at any given time, one of the control loops 204, 206 (e.g., the control loop with the active compensator) provides an output pi_out for controlling the power converter. This output pi_out is compared to a PWM signal reference Fpwm to generate a PWM control signal PWM_OUT for controlling one or more power switches of the power converter as explained above. For example, if the power converter is operated in its CC mode, the current control loop 206 is active and the output pi_out equals an output ipi_out of the current control loop 206. Alternatively, if the power converter is operated in its CV mode, the voltage control loop 204 is active and the output pi_out equals an output vpi_out of the voltage control loop 204.

The compensators V_PID, I_PID can be activated and/or deactivated by various different methods. For example, the control circuit 200 may call a function of one compensator to activate it and not call (e.g., no action) a function of the other compensator. In such cases, the active compensator can update the output pi_out on an exit of the function. This may reduce control circuit resources (e.g., computation process, etc.).

Figure 4:
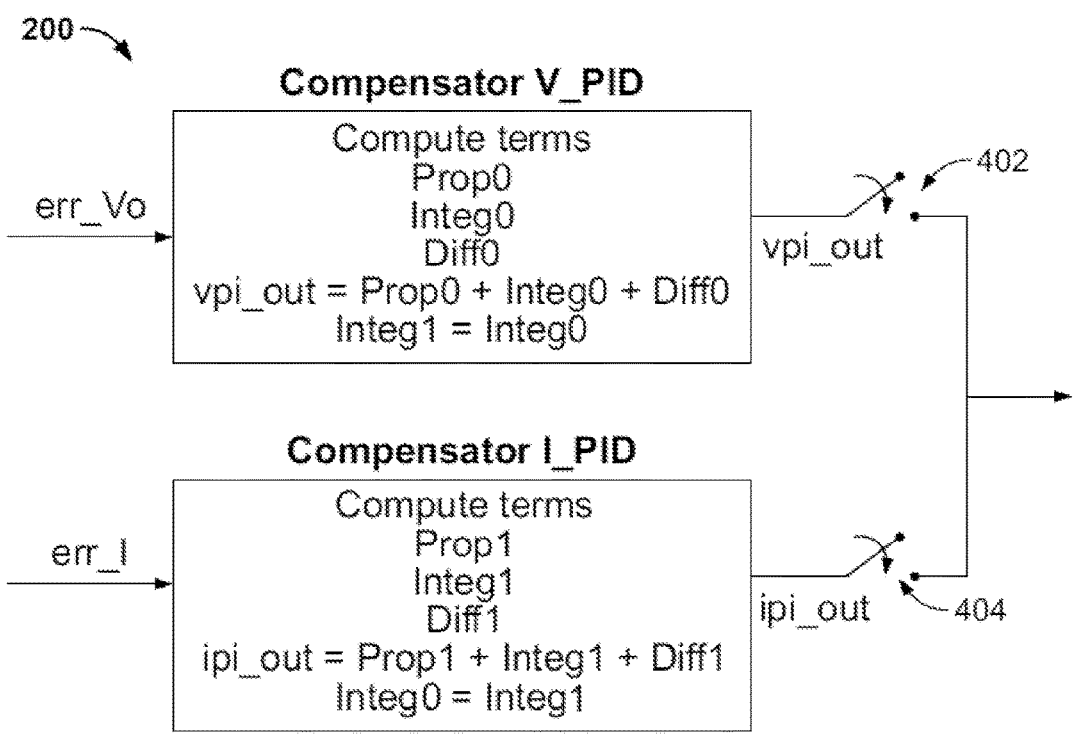
FIG. 4 is a block diagram of compensators of FIG. 2 and controllable switches for selecting an output of one of the compensators for controlling the power converter in an appropriate control mode according to another example embodiment.

In other examples, the compensators V_PID, I_PID can be activated with an enable signal and/or deactivated with a disable signal provided to one or both compensators, switch(es) coupled to the compensators, etc. For instance, FIG. 4 illustrates a portion of the digital control circuit 200 including the voltage compensator V_PID and the current compensator I_PID that are activated and deactivated based on a position of switches 402, 404. In such examples, the switches 402, 404 may be controlled by the signals CV_mode, CC_mode. As such, an output of one compensator (the active compensator) is selected and connected to the output pi_out, and an output of the other compensator (the inactive compensator) is disconnected from the output pi_out.

Similar to the control circuit 104 of FIG. 1, the control circuit 200 of FIG. 2 sets the output of the integrator circuit from the non-controlling compensator to equal the output of the integrator circuit from the controlling compensator. For example, when the power converter is operated in its CC mode, the output of the integrator circuit (e.g., the integrator component I of FIG. 3) from the voltage compensator V_PID (i.e., the non-controlling compensator) is set to equal the output of the integrator circuit from the current compensator I_PID (i.e., the controlling compensator).

Additionally, and as explained above, each compensator V_PID, I_PID may include one or more circuit(s) having an output in addition to its respective integrator circuit. In such circumstances, these outputs are computed for the controlling compensator (e.g., the active compensator). The output of the circuit(s) from the non-controlling compensator, however, can be set to substantially zero or another suitable value. This may take place, for example, during a transition between the control modes.

For instance, when the power converter is operated in its CC mode, the outputs of the other circuit(s) from the voltage compensator V_PID may be set to substantially zero. Thus, in the particular voltage compensator V_PID 300 of FIG. 3, outputs of the proportional component P and the derivative component D can be set to substantially zero.

For example, in FIG. 4, the current compensator I_PID is the controlling compensator and the voltage compensator V_PID is the non-controlling compensator. Thus, in this particular example, a proportional component output (Prop1), a derivative component output (Diff1), and an integrator component output (Integ1) of the current compensator I_PID are computed and summed as explained above. Additionally, a proportional component output (Prop0) and a derivative component output (Diff0) of the voltage compensator V_PID are set to substantially zero, and an integrator component output (Integ0) is set to equal the computed integrator component output (Integ1) of the current compensator I_PID as explained above.

FIG. 5 illustrates another example digital control circuit 500 substantially similar to the digital control circuit 200 of FIG. 2 and that also may be employed as the control circuit 104 of FIG. 1. The digital control circuit 500 of FIG. 5, however, includes a mode detection circuit 502 different than the mode detection circuit 202 of FIG. 2. For example, the digital control circuit 500 can control any one of the power converters disclosed herein to operate in a CV mode and a CC mode based on comparisons between two or more parameters and two or more references.

The control circuit 500 senses the output voltage Vo and the current ISENSE of the power converter. In the particular example of FIG. 5, the sensed current ISENSE is the output current of the power converter. In other embodiments, the current ISENSE may be another suitable current of the power converter such as an input current, an intermediate current, etc. Additionally and/or alternatively, the control circuit 500 may utilize another voltage such as an input voltage instead of the output voltage Vo.

As shown in FIG. 5, the mode detection circuit 502 includes operational amplifiers 504, 506 coupled to AND gates 508, 510, and a SR NOR latch 512. In particular, the operational amplifier 504 receives the sensed current ISENSE of the power converter and the current reference IREF (as explained above) and outputs a signal to the AND gate 508. The AND gate 508 then outputs a signal to the set (S) input of the SR NOR latch 512. Similarly, the operational amplifier 506 receives the sensed output voltage Vo of the power converter and the voltage reference VREF (as explained above) and outputs a signal to the AND gate 510. The AND gate 510 then outputs a signal to the reset (R) input of the SR NOR latch 512.

In the particular example of FIG. 5, the CC mode is selected if the sensed current ISENSE is greater than or equal to the current reference IREF and the CV mode is selected if the sensed output voltage Vo is greater than or equal to the voltage reference VREF. For example, if the sensed current ISENSE is greater than or equal to the current reference IREF and the control circuit 500 is operating the power converter in its CC mode, the output Q of the latch 512 is high, the complement output Q' of the latch 512 is low, and the output of the operational amplifier 504 is high as the sensed current ISENSE is greater than or equal to the current reference IREF. As such, the output of the AND gate 508 (and the set (S) input of the latch 512) is low. If the output of the operational amplifier 506 remains low (e.g., because the sensed output voltage Vo is less than the voltage reference VREF), the output of the AND gate 510 (and the reset (R) input of the latch 512) is low. This causes the latch 512 to latch with the signal CC_mode activated and the signal CV_mode deactivated.

If, however, the sensed output voltage Vo becomes greater than or equal to the voltage reference VREF, the output of the operational amplifier 506 becomes high causing the output of the AND gate 510 (and the reset (R) input) to become high. This causes the outputs of the latch 512 to flip-flop. That is, the complement output Q' becomes high and the output Q becomes low thereby activating the signal CV_mode and deactivating the signal CC_mode. This flip flopping can continue based on the sensed output voltage Vo and the sensed current ISENSE. As such, the mode transition from the CC mode to the CV mode is based on a comparison between the sensed output voltage Vo and the voltage reference VREF and the mode transition from the CV mode to the CC mode based on a comparison between the sensed current ISENSE and the current reference IREF.

In other embodiments, the mode detection circuit 502 may be implemented with software functionality instead of the AND gates 508, 510 and/or the SR NOR latch 512 of FIG. 5.

FIGS. 6A-C illustrate various waveforms based on the control circuit 500 of FIG. 5. In particular, FIGS. 6A and 6B illustrate an output current and an output voltage (represented by lines 602 and 604), respectively, of a power converter controlled by the control circuit 500. FIG. 6C illustrates the output pi_out of FIG. 5, the output ipi_out of the current compensator I_PID of FIG. 5, and a selected mode state, as represented lines 606, 608, 610, respectively. When the line 610 is equal to zero, the selected mode state is CV mode and when the line 610 is equal to 0.5, the selected mode state is CC mode.

In block A of FIGS. 6A-C, the output current (line 602 of FIG. 6A) of the power converter begins to increase causing the power converter to become overloaded. As such, the output current (line 602) increases and the output voltage (line 604) decreases, as shown in FIGS. 6A and 6B. At this time, the control circuit 500 transitions from controlling the power converter in its CV mode to its CC mode as shown in FIG. 6C. As such, the current compensator output (line 608 of FIG. 6C) is used to control the power converter.

As shown in block A of the FIG. 6C, the output pi_out (line 606) quickly catches the output ipi_out (line 608) and continues at the output ipi_out after control is switched from CV mode to CC mode. As such, the transition from the CV mode to the CC mode is made without a substantial glitch in the output current (line 602) and the output voltage (line 604), as shown in FIGS. 6A and 6B. This is a result of setting the integrator circuit output of the current compensator (i.e., the non-controlling compensator previous to the transition in block A) to equal the integrator circuit output of the voltage compensator (i.e., the controlling compensator previous to the transition in block A) as explained above.

When the power converter transitions from its CV mode to its CC mode in block A, the integrator circuit output of the voltage compensator (i.e., the non-controlling compensator after block A) can equal zero, its last active value, a max value, or another suitable value as explained above. This may continue until the power converter transitions back to its CV mode in block B as shown in FIG. 6C. At this point, the integrator circuit output of the voltage compensator is set to equal the output of the current integrator circuit as explained above.

In some cases, output capacitors in the power converter may cause an output current overshoot when the power converter transitions to its CC mode in block A. This overshoot can be shortened by, for example, reducing the size of output capacitors.

As shown in block B of FIG. 6C, the power converter transitions back to its CV mode when the output voltage (line 604) becomes greater than the voltage reference VREF. Before this transition, however, the output pi_out increases at a fast rate (e.g., a glitch 612 lasting about one PWM cycle) due to a high load slew rate. This increase before transitioning to the CV mode may push the output voltage to its regulated level faster. The high load slew rate may be due to a difference between the sensed output voltage of the power converter and the voltage reference VREF.

Once the power converter transitions to its CV mode (block B), the voltage compensator is activated and the output pi_out matches the output vpi_out (not shown). At the same time, the output voltage (line 604) experiences a minor overshoot before settling at the regulated voltage (12 V). The overshoot is insignificant compared to overshoots experienced in conventional method, and can be reduced further by optimizing compensator values.

Additionally, after the power converter transitions from its CC mode to its CV mode in block B, the output ipi_out (line 608) of the current compensator (i.e., the non-controlling compensator after block B) is equal to its last active value. Thus, the output ipi_out is maintained as shown in FIG. 6C. Alternatively, the output ipi_out can be set to zero, a max value, or another suitable value as explained above.

In some embodiments, the load slew rate may be adjusted to substantially remove the glitch 612. For example, the voltage reference VREF (or another the voltage reference disclosed herein) may be set to equal an initially sensed voltage of the power converter to provide a soft start. This may reduce a settling time of the voltage compensator and provide a tighter output voltage control. After which, the voltage reference can be adjusted if desired.

FIGS. 7A-C illustrate various waveforms substantially similar to the waveforms of FIGS. 6A-C. The waveforms of FIGS. 7A-C, however, correspond to the control circuit 500 controlling a power converter to provide a soft start as explained above. Additionally, transitioning between modes is based on a condition of the output current. In particular, the CC mode is selected if the output current is greater than the current reference IREF, and the CV mode is selected if the output current is less than the current reference IREF minus one percent of the current reference IREF (i.e., IREF−0.01*IREF).

As shown in block C of the FIG. 7C, the power converter transitions back to its CV mode from its CC mode. This is indicated by the line 610 representing the selected mode state as explained above. As shown, the output pi_out (line 706) gradually increases due to the adjusted load slew rate (as compared to FIGS. 6A-6C). As such, the output voltage (line 704) of FIG. 7B is tightly controlled at a slower increment rate until reaching its nominal output regulation (12V) as compared to the output voltage (line 604) of FIG. 6B. This may minimize an output voltage overshoot. Similarly, and as shown in FIG. 7A, the output current (line 702) transitions with less fluctuation than the output current (line 602) of FIG. 6A.

Additionally, and similar to the output ipi_out (line 608) of FIG. 6C, after the power converter transitions to its CV mode in block C, the output ipi_out (line 708) of the current compensator is equal to its last active value.

FIGS. 8A-C illustrate various waveforms substantially similar to the waveforms of FIGS. 6A-C. The waveforms of FIGS. 8A-C, however, correspond to the control circuit 500 of FIG. 5 controlling a power converter transitioning between modes based on the output current condition as explained in FIGS. 7A-C. FIGS. 8A and 8B illustrate an output current (line 802) and an output voltage (line 804), respectively, of the power converter.

When the power converter is operating in its CC mode (before block D as by line 610 of FIG. 8C), the output pi_out (line 806) matches an output ipi_out (line 808) of the current compensator as explained above. After the power converter transitions to its CV mode in block D, the output pi_out (line 806) ramps up rapidly and eventually matches the output vpi_out (not shown).

This ramp up is due to the difference between the output voltage (line 804) of FIG. 8B and the voltage reference VREF of FIG. 5, as explained above. However, when transitioning between modes based on the output current condition (instead of the output voltage condition of FIGS. 6A-6C), an overshoot of the output voltage (line 804) is reduced compared to the overshoot of the output voltage (line 604) of FIG. 6B. This is caused by the output current condition triggering earlier than the output voltage condition of FIGS. 6A-6C. As such, the transition between modes (and thus control based on the output vpi_out) starts earlier to reduce this overshoot.

Although the control circuits 200, 500 of FIGS. 2 and 5 are digital control circuits, it should be understood that any one of the control circuits disclosed herein may be a digital control circuit, an analog control circuits or a hybrid control circuit (e.g., a digital control circuit and an analog circuit). The digital control circuits may include a digital signal control circuit (DSC), a digital signal processor (DSP), etc. Additionally, the control circuits may include one or more processors for implementing converter control features as explained herein. Further, one or more components (e.g., processor(s), components, etc.) of the control circuits may be disposed on one or more integrated circuits.

For example, FIG. 9 illustrates an analog control circuit 900 implementing the methods for controlling a power converter to operate in a CC mode and a CV mode as disclosed herein. The control circuit 900 may be employed as at least a part of the control circuit 104 of FIG. 1. As shown in FIG. 9, the control circuit 900 includes a current integrator circuit 902 and a voltage integrator circuit 904. The current integrator circuit 902 includes a comparator 906, capacitors C3, C4, C5, and resistors R4, R5, R6, and the voltage integrator circuit 904 includes a comparator 908, capacitors C1, C2, C6, and resistors R1, R2, R3. The control circuit 900 may include additional circuitry including, for example, a proportional circuit, a derivative circuit, etc.

The comparator 906 compares a sensed current ISENSE and a current reference IREF, and provides an output of the current integrator circuit 902 for controlling the power converter in its CC mode. Similarly, the comparator 908 compares a sensed voltage VSENSE and a voltage reference VREF, and provides an output of the voltage integrator circuit 904 for controlling the power converter in its CV mode.

When the power converter transitions from its CV mode to its CC mode (as explained above), a value of the capacitor C5 of the current integrator circuit 902 (the non-controlling circuit) is set to equal a value of the capacitor C6 of the voltage integrator circuit 904 (the controlling circuit). During this time, the capacitors C3, C4 are shorted to reset their values. As such, the output of the current integrator circuit 902 is set to equal the output of the voltage integrator circuit 904.

Similarly, when the power converter transitions from its CC mode to its CV mode, the value of the capacitor C6 of the voltage integrator circuit 904 (the non-controlling circuit) is set to equal the value of the capacitor C5 of the current integrator circuit 904 (the controlling circuit). Additionally, the capacitors C1, C2 are shorted to reset their values. As such, the output of the voltage integrator circuit 904 is set to equal the output of the current integrator circuit 902.

Although not shown in FIG. 9, the control circuit 900 includes a mode detection circuit. This mode detection circuit may be any one of the mode detection circuits disclosed herein, or another suitable mode detection circuit. Based on the sensed current and/or voltage, the mode detection circuit can send a signal (cc_mode and/or cv_mode) to one or both switches 910, 912 coupled between the integrator circuits and an output pi_out of the control circuit 900. Thus, and as explained above, the output of one integrator circuit (e.g., the controlling circuit) can be selected and connected to the output pi_out, and the output of the other integrator circuit (the non-controlling circuit) can be disconnected from the output pi_out.

Additionally, the features disclosed herein may be implemented into an existing control circuit. For example, the features may be coded and embedded into appropriate digital components of an existing control circuit. Thus, implementing the features to an existing control circuit will not require additional circuit components and therefore will not increase costs of the control circuit.

The power converters disclosed herein may include any suitable converter able to operate in different control modes. For example, the power converters may include a forward converter, a push-pull forward converter, a flyback converter, a grid tie inverter, etc. Additionally, the power converters may have any suitable topology such as a half bridge topology, a full bridge topology, a buck topology, a boost topology, a buck-boost topology; etc. Further, the power converters may be a component of a power supply such as a server power supply, a pulsed power supply, a backup power supply, a power supply for an LED, etc. For example, the power converters may be a component of an AC-DC power supply, a DC-DC power supply, etc.

Although the compensators disclosed herein are PID controllers, it should be understood that other suitable compensators may be employed. For example, the compensators may include a proportional-integral (PI) controller, etc. Additionally, the PID controllers may be a pole-zero PID controller, a pole PID controller, etc. Further, because the compensators are treated independently, compensators of one control circuit may be different. For example, a voltage compensator of a control circuit may be a PID controller and a current compensator of the same control circuit may be a PI controller.

Additionally, in some embodiments, only the controlling integrator circuits are active and thus use control circuit resources. As such, non-controlling integrator circuits are inactive and do not use control circuit resources. Therefore, no additional control circuit bandwidth is needed in a control circuit (including an existing control circuit) including such features.

By employing one or more features disclosed herein, transitioning between control modes may be more stable, more accurate, less complex and faster than conventional methods without increasing control circuit bandwidth and costs. As such, control mode efficiency may improve as compared to conventional systems as less unnecessary transitioning events may occur. Additionally, output glitches may be reduced (and in some cases eliminated) when transitioning between control modes as compared to conventional systems. For example, by setting an output of a non-controlling integrator circuit to equal an output of a controlling integrator circuit before transitioning between control modes, output glitches may be as small as one PWM cycle, less than about 100 microseconds, etc. without taking into account possible settling time of a compensator and/or hardware limitations.

Further, control circuit resources required to implement the feature(s) may be reduced as compared to conventional systems. For example, a control circuit implementing the feature(s) disclosed herein may require about a three percent increase in resources as compared to conventional systems which may require about a twenty percent increase in resources.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A control circuit for controlling a power converter to operate in a first mode and a second mode different than the first mode, the control circuit comprising a first integrator circuit corresponding to the first mode and having an output and a second integrator circuit corresponding to the second mode and having an output, the control circuit configured to transition control of the power converter between the first mode and the second mode such that one of the first mode and the second mode is a controlling mode for a period of time and the other one of the first mode and the second mode is a non-controlling mode for the period of time, and set the output of the first integrator circuit or the second integrator circuit corresponding to the non-controlling mode to equal the output of the first integrator circuit or the second integrator circuit corresponding to the controlling mode.

2. The control circuit of claim 1 wherein the first mode is a constant voltage mode and the second mode is a constant current mode.

3. The control circuit of claim 2 wherein the control circuit is configured to sense a voltage and a current of the power converter, transition from the constant voltage mode to the constant current mode based on a comparison between the sensed current and a current reference, and transition from the constant current mode to the constant voltage mode based on a comparison between the sensed voltage and a voltage reference.

4. The control circuit of claim 3 wherein the control circuit is configured to set the voltage reference to equal an initially sensed voltage.

5. The control circuit of claim 1 wherein the control circuit is configured to transition from the first mode to the second mode based on a sensed parameter and to transition from the second mode to the first mode based on another sensed parameter.

6. The control circuit of claim 1 wherein the control circuit is configured to transition between the first mode and the second mode based on one sensed parameter.

7. The control circuit of claim 1 further comprising a voltage compensator including the first integrator circuit and a current compensator including the second integrator circuit.

8. The control circuit of claim 7 wherein the voltage compensator or the current compensator corresponding to the non-controlling mode is inactive.

9. The control circuit of claim 8 wherein the voltage compensator and the current compensator each include one or more circuits different than its integrator circuit, wherein each of the one or more circuits includes an output, and wherein the output of each of the one or more circuits of the voltage compensator or the current compensator corresponding to the non-controlling mode is set to substantially zero.

10. The control circuit of claim 9 wherein at least one of the voltage compensator and the current compensator is a proportional-integral-derivative (PID) controller.

11. The control circuit of claim 1 wherein the control circuit includes a digital control circuit.

12. A power system for providing power to a load, the power system comprising a power converter and the control circuit of claim 1 coupled to the power converter.

13. A method of configuring a control circuit for controlling a power converter controllable to operate in a first mode and a second mode different than the first mode such that one of the first mode and the second mode is a controlling mode for a period of time and the other one of the first mode and the second mode is non-controlling mode for the period of time, the control circuit including a first integrator circuit corresponding to the first mode and a second integrator circuit corresponding to the second mode, the method comprising:
    setting an output of the first integrator circuit or the second integrator circuit corresponding to the non-controlling mode to equal an output of the first integrator circuit or the second integrator circuit corresponding to the controlling mode, and
    transitioning control of the power converter from the first mode or the second mode corresponding to the controlling mode to the first mode or the second mode corresponding to the non-controlling mode.

14. The method of claim 13 wherein the first mode is a constant voltage mode and the second mode is a constant current mode and wherein transitioning control of the power converter includes transitioning from the constant voltage mode to the constant current mode based on a comparison between a sensed current of the power converter and a current reference and transitioning from the constant current mode to the constant voltage mode based on a comparison between a sensed voltage of the power converter and a voltage reference.

15. The method of claim 14 further comprising setting the voltage reference to equal an initially sensed voltage.

16. The method of claim 13 wherein the control circuit includes a voltage compensator having the first integrator circuit and a current compensator having the second integrator circuit, the method further comprising deactivating the voltage compensator or the current compensator corresponding to the non-controlling mode.

17. The method of claim 16 further comprising setting an output of one or more circuits of the deactivated voltage compensator different than its integrator circuit or the deactivated current compensator different than its integrator circuit to substantially zero.

18. The method of claim 13 wherein transitioning control of the power converter includes transitioning based on one sensed parameter.

19. The method of claim 13 wherein the control circuit includes a digital control circuit.

* * * * *